(12) United States Patent
Hou et al.

(10) Patent No.: US 11,837,924 B2
(45) Date of Patent: Dec. 5, 2023

(54) ELECTRIC MACHINE SPLITTING OR ASSEMBLING DEVICE, ELECTRIC MACHINE SPLITTING METHOD, AND ELECTRIC MACHINE ASSEMBLING METHOD

(71) Applicant: Xinjiang Goldwind Science & Technology Co., Ltd., Urumqi (CN)

(72) Inventors: Nan Hou, Beijing (CN); Jiuyang Luo, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 0 days.

(21) Appl. No.: 17/758,203

(22) PCT Filed: Jun. 9, 2020

(86) PCT No.: PCT/CN2020/095064
§ 371 (c)(1),
(2) Date: Jun. 29, 2022

(87) PCT Pub. No.: WO2021/135075
PCT Pub. Date: Jul. 8, 2021

(65) Prior Publication Data
US 2023/0238862 A1 Jul. 27, 2023

(30) Foreign Application Priority Data
Dec. 31, 2019 (CN) .......................... 201911408904.7

(51) Int. Cl.
*H02K 15/00* (2006.01)
*H02K 7/18* (2006.01)
(Continued)

(52) U.S. Cl.
CPC ....... *H02K 15/0006* (2013.01); *H02K 7/1838* (2013.01); *H02K 15/03* (2013.01); *H02K 15/16* (2013.01); *Y10T 29/53143* (2015.01)

(58) Field of Classification Search
CPC .... H02K 15/02; H02K 15/0006; H02K 15/00; F03D 9/25; Y10T 29/53143
(Continued)

(56) References Cited

U.S. PATENT DOCUMENTS

| | | | |
|---|---|---|---|
| 2012/0112466 A1 | 5/2012 | Junge et al. | |
| 2016/0003216 A1* | 1/2016 | Gebhard | ................. A47L 11/34 29/889.1 |
| 2016/0079834 A1* | 3/2016 | Moskowitz | ............. H02K 1/27 310/156.01 |

FOREIGN PATENT DOCUMENTS

| | | |
|---|---|---|
| CN | 101320931 A | 12/2008 |
| CN | 107947501 A | 4/2018 |

(Continued)

OTHER PUBLICATIONS

International Search Report in corresponding PCT Application No. PCT/CN2020/095064 dated Sep. 23, 2020 (10 pages).
(Continued)

*Primary Examiner* — Thiem D Phan
(74) *Attorney, Agent, or Firm* — Bayes PLLC (57) ABSTRACT

The present application relates to an electric machine splitting or assembling method, an electric machine assembling method, and an electric machine splitting or assembling device including a sleeving device separating or coaxially sleeving first and second rotary bodies; the first disassembly device fixes the first rotary body and includes at least two first separable portions, and the first rotary body is split into petals in a circumferential direction by disassembling the first separable portions, or its respective petal segments are assembled in the circumferential direction by combining the
(Continued)

first separable portions; and the second disassembly device is fixed to the second rotary body and includes at least two second separable portions, and the second rotary body is split into petals in the circumferential direction by disassembling the second separable portions, or its respective petal segments are assembled in the circumferential direction by combining the second separable portions.

20 Claims, 7 Drawing Sheets

(51) Int. Cl.
    *H02K 15/03*    (2006.01)
    *H02K 15/16*    (2006.01)

(58) Field of Classification Search
    USPC .................. 29/732, 596, 598, 729, 762, 770
    See application file for complete search history.

(56) References Cited

FOREIGN PATENT DOCUMENTS

| CN | 108843517 | A | 11/2018 |
|---|---|---|---|
| CN | 109149887 | A | 1/2019 |
| CN | 109625558 | A | 4/2019 |
| DE | 102010039590 | A1 | 2/2012 |
| EP | 2590301 | A1 | 5/2013 |
| EP | 4068595 | A1 | 10/2022 |
| WO | 2015024590 | A1 | 2/2015 |
| WO | 2016058596 | A1 | 4/2016 |
| WO | 2019109588 | A1 | 6/2019 |

OTHER PUBLICATIONS

Office Action from corresponding Chinese Application No. 201911408904.7 dated Apr. 28, 2022 (10 pages).

Extended European Search Report in related European Application No. 20910871.1 dated Dec. 16, 2022 (9 pages).

Second Office Action in related Chinese Application No. 201911408904.7 dated Nov. 24, 2022 (4 pages).

Office Action in related Indian Application No. 202217036541 dated Nov. 9, 2022 (5 pages).

Office Action in related Australian Application No. 2020415851 dated Feb. 8, 2023 (4 pages).

* cited by examiner

| | |
|---|---|
| assembling respective petal segments of a first rotary body into a complete first rotary body by combining a first separable portion to form a first disassembly device and assembling respective petal segments of the second rotary body into a complete second rotary body by combining a second separable portions to form a second disassembly device | R1 |
| fixing the sleeving device to the first rotary body and the second rotary body respectively | R2 |
| sleeving and fixing the second rotary body and the first rotary body by the sleeving device and removing the sleeving device to form a complete electic machine | R3 |

Fig. 15

ELECTRIC MACHINE SPLITTING OR ASSEMBLING DEVICE, ELECTRIC MACHINE SPLITTING METHOD, AND ELECTRIC MACHINE ASSEMBLING METHOD

CROSS-REFERENCE TO RELATED APPLICATIONS

This application is a national stage of International Application No. PCT/CN2020/095064, filed on Jun. 9, 2020, which claims priority to Chinese Patent Application No. 201911408904.7, filed on Dec. 31, 2019. The entire contents of each of the above-identified applications are expressly incorporated herein by reference.

TECHNICAL FIELD

The present application relates to a technical field of electric machine, and in particular to an electric machine splitting or assembling device and an electric machine splitting method.

BACKGROUND

As the single power of a wind turbine becomes larger and larger, an outer diameter of an electric machine becomes larger and larger. If the outer diameter of a large-diameter electric machine exceeds 4.5 meters, there is a risk of exceeding the road transportation limit and its transportation cost will increase sharply or it is impossible to be transported, which limits the development of the large-diameter electric machine.

SUMMARY

The purpose of the present application provides an electric machine splitting or assembling device, an electric machine splitting method, and an electric machine assembling method, in which the solution fully takes the characteristics of a stator, a rotor, and respective components of the electric machine into account, and proposes a splitting device and method in which the electric machine is transported after being disassembled into respective separate parts, which solves the problem that the electric machine, especially large-diameter electric machine, exceeds the road transportation limit and the transportation cost is high.

On this purpose, the present application proposes an electric machine splitting or assembling device, including at least one of a first disassembly device or a second disassembly device, and a sleeving device, wherein the sleeving device is configured for separating or coaxially sleeving a first rotary body and a second rotary body of the electric machine; the first disassembly device is configured for fixing the first rotary body and includes at least two first separable portions which are detachably connected with each other, and the first rotary body is split into petals in a circumferential direction by disassembling the first separable portions by the first disassembly device, or respective petal segments of the first rotary body are assembled in the circumferential direction by combining the first separable portions by the first disassembly device; and the second disassembly device is configured to be fixed to the second rotary body and includes at least two second separable portions which are detachably connected with each other, and the second rotary body is split into petals in the circumferential direction by disassembling the second separable portions by the second disassembly device, or respective petal segments of the second rotary body are assembled in the circumferential direction by combining the second separable portions by the second disassembly device.

In another aspect, the present application further proposes an electric machine splitting method, splitting an electric machine into petals by using the electric machine splitting or assembling device described above, the electric machine including a first rotary body and a second rotary body disposed coaxially to each other, and the electric machine splitting method includes fixing the electric machine to the first disassembly device; separating the first rotary body from the second rotary body by a sleeving device and fixing the second rotary body to the second disassembly device; and splitting the second rotary body into petals by the second disassembly device and splitting indwelling first rotary body into petals by the first disassembly device.

In another aspect, the present application proposes an electric machine assembling method, assembling respective petal segments of an electric machine by using the electric machine splitting or assembling device described above, and the electric machine including a first rotary body and a second rotary body disposed coaxially to each other, the electric machine assembling method includes assembling respective petal segments of the first rotary body into a complete first rotary body by combining the first separable portions to form a first assembling device and assembling respective petal segments of the second rotary body into a complete second rotary body by combining the second separable portions to form a second disassembly device; fixing the sleeving device to the first rotary body and the second rotary body respectively; and sleeving and fixing the first rotary body and the second rotary body by the sleeving device and disassembling the sleeving device to form a complete electric machine.

The present application provides an electric machine splitting or assembling device, an electric machine splitting method, or an electric machine assembling method, the first rotary body and the second rotary body of the electric machine are separated or assembled by the sleeving device, the first rotary body is split into petals in the circumferential direction or the respective petal segments after being split is assembled to the first rotary body by the first disassembly device, the second rotary body is split into petals in the circumferential direction or the respective petal segments after being split is assembled to the second rotary body by the second disassembly device, and the respective petal segments after being split is fixedly connected with and transported together with the disassembly device, either of the first rotary body and the second rotary body is a stator, and the other of the first rotary body and the second rotary body is a rotor, which effectively solves the problem that the electric machine exceeds the road transportation limit and the transportation cost is high.

BRIEF DESCRIPTION OF DRAWINGS

The present application can be better understood from the following description of the embodiments of the present application in conjunction with the accompanying drawings, wherein by reading the following detailed description of the non-limiting embodiments with reference to the accompanying drawings, other features, objects, and advantages of the present application will become more apparent, and the same or similar reference numbers indicate the same or similar features.

DESCRIPTION OF THE REFERENCE NUMBERS

1—first rotary body; 2—second rotary body; 3—spindle; 3a—fixed shaft; 3b—rotating shaft; 3c—bearing; 4—end cover;

10—first disassembly device; 101—first separable portion; 11—first fixing portion; 12—second fixing portion; 15—fifth fixing portion; 16—sixth fixing portion; 18—eighth fixing portion; 19—the first connecting portion;

20—second disassembly device; 201—second separable portion; 23—third fixing portion;

24—fourth fixing portion; 27—seventh fixing portion; 28—second connecting portion;

30—sleeving device; 31—first sleeving member; 311—first flange portion; 312—first body part; 32—second sleeving member; 321—second flange portion; and 322—second body part.

DETAILED DESCRIPTION

The features and exemplary embodiments of various aspects of the present application will be described in detail below. Many details are disclosed in the following detailed description in order to fully understand the present application. However, it is obvious to those skilled in the art that the present application can be implemented without some of these details. The following description of the embodiments is only to provide a better understanding of the present application by showing examples of the present application. The present application is by no means limited to any specific configurations and algorithms proposed below, but covers any modification, replacement, and improvement of elements, components, and algorithms without departing from the gist of the present application. In the drawings and the following description, well-known structures and technologies are not shown in order to avoid unnecessary obscurity of the present application.

In order to better understand the present application, an electric machine splitting or assembling device, an electric machine splitting method, and an electric machine assembling method provided by embodiments of the present application are described in detail below with reference to FIGS. 1 to 15. Generally, the electric machine splitting or assembling device and the electric machine splitting method are suitable for an electric machine having a diameter of 4.5 meters or more, but can also be applied to electric machines of all sizes.

An electric machine in the present application may be a structure of an inner stator and an outer rotor or a structure of an inner rotor and an outer stator. In the present application, the solution is described by taking an electric machine having a structure of an inner stator and an outer rotor as an example. In the present application, a term "radial" refers to a diameter direction of the large-diameter electric machine, that is, a diameter direction of the stator and rotor, a term "axial" refers to a direction of a rotation axis of the large-diameter electric machine, and a term "circumferential" refers to a circumferential direction of the large-diameter electric machine.

Figure 1:
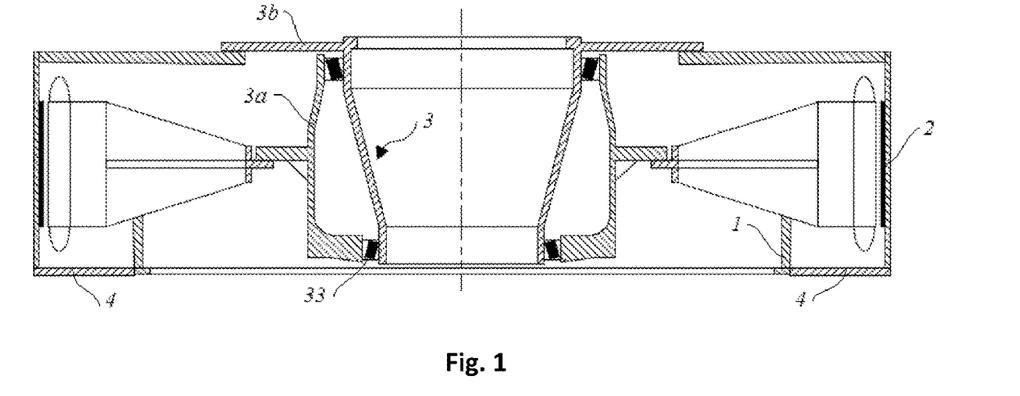
FIG. 1 is a schematic structural diagram of an electric machine provided by an embodiment of the present application.

FIG. 1 schematically shows an electric machine having a structure of an inner stator and an outer rotor, and the electric machine includes a stator 1, a rotor 2, a spindle 3, and an end cover 4. The spindle 3 includes a fixed shaft 3a, a rotating shaft 3b, and a bearing 33 disposed between the fixed shaft 3a and the rotating shaft 3b which are disposed coaxially to each other. The stator 1 is connected with the fixed shaft 3a by a stator flange, and the stator flange is disposed in an intermediate region of the stator in an axial direction; and the rotor 2 is connected with the rotating shaft 3b by a rotor flange, and the rotor flange is disposed in an end region in the axial direction, as shown in FIG. 1, an upper end region in the axial direction. The electric machine is covered by an end cover 4, which covers a portion of a lower end portion of the rotor 2 in the axial direction from a radial edge to a radial center region (an axial end opposite to the rotor flange).

For the large-diameter electric machine, especially a megawatt-level wind turbine, the magnetic attraction force between the stator 1 and the rotor 2 can reach several tons. During splitting the large-diameter electric machine into petals and transporting the large-diameter electric machine, it is necessary to overcome the magnetic attraction force among the petals to separate the petals from each other, and thus, it is necessary to customize firm positioning of the splitting device, and after repeated studies and simulations, it is necessary to dispose an additional fixing device to prevent the deformation of respective petal components, thereby ensuring that the electric machine splitting will not affect the electrical performance of the electric machine in many aspects.

Figure 2:
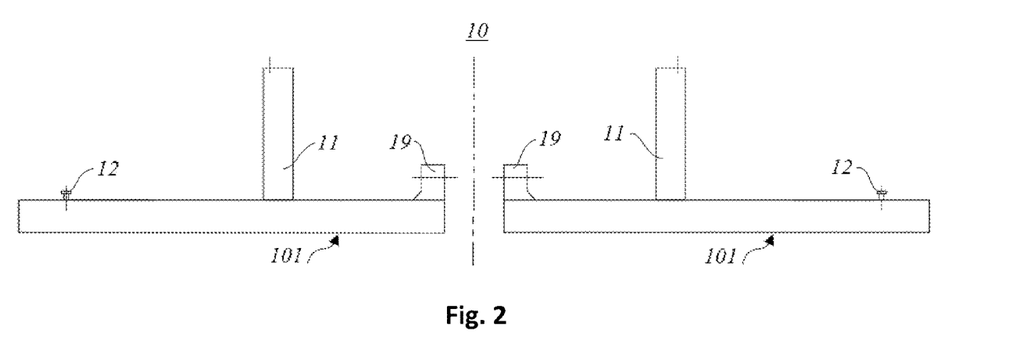
FIG. 2 is a schematic structural diagram of a first disassembly device in an electric machine splitting or assembling device provided by an embodiment of the present application.
Figure 3:
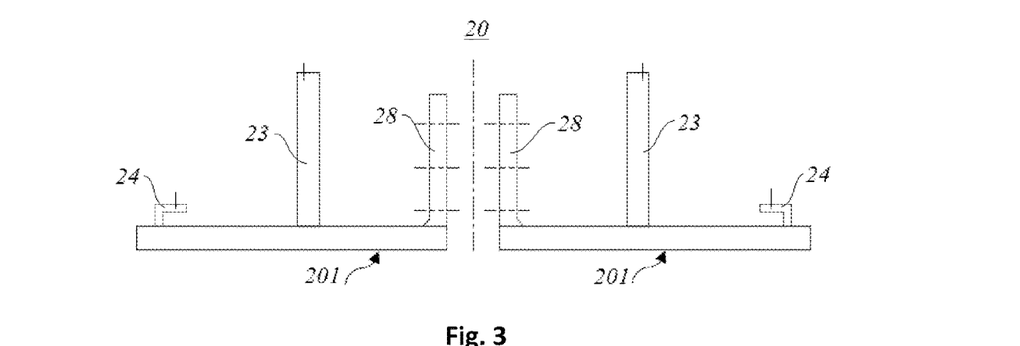
FIG. 3 is a schematic structural diagram of a second disassembly device in an electric machine splitting or assembling device provided by an embodiment of the present application.
Figure 4:
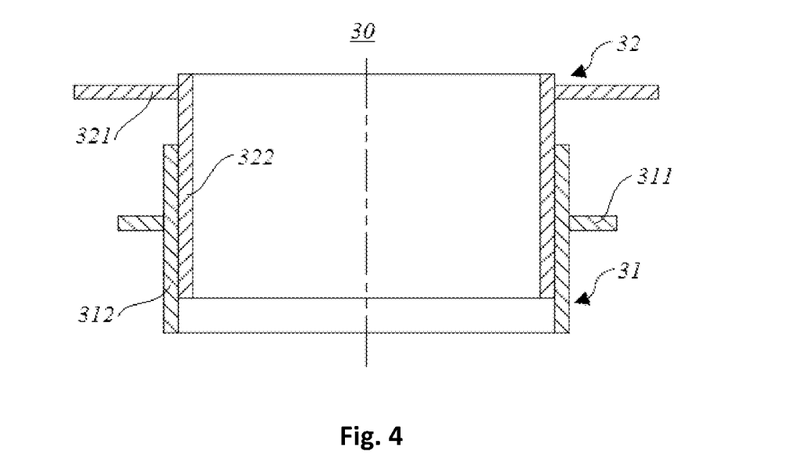
FIG. 4 is a schematic structural diagram of a sleeving device in an electric machine splitting or assembling device provided by an embodiment of the present application.

FIGS. 2 to 4 show an electric machine splitting or assembling device provided by an embodiment of the present application. In some embodiments, the electric machine has at least two petals which are evenly located in a circumferential direction of the electric machine. And in some embodiments, all large components of the electric machine, such as the stator, the rotor, and the end cover, can be manufactured by being split into petals, or at least one of the stator, the rotor, or the end cover can be manufactured by being split into petals. In the case that only at least one of the large components of the electric machine is manufactured by being split into petals, the components manufactured by being split into petals are suitable for a disassembling device, a disassembling method, an assembling method, and a transporting method of the present application, particularly as described below; and the other components are according to the traditional manufacturing and transporting methods, and the description of the traditional manufacturing and transporting methods will not be repeated in the present application.

In some embodiments, the electric machine splitting or assembling device includes a first disassembly device 10 shown in FIG. 2, a second disassembly device 20 shown in FIG. 3, and a sleeving device 30 shown in FIG. 4.

The sleeving device 30 is configured for separating or coaxially sleeving a first rotary body 1 and a second rotary body 2 of the electric machine. Either of the first rotary body and the second rotary body is a stator, and the other of the first rotary body and the second rotary body is a rotor, which is determined depending on the structure of the electric machine.

FIG. 2 shows a schematic diagram of the first disassembly device 10, and the first disassembly device 10 is configured for fixing the first rotary body 1. The first disassembly device 10 includes at least two first separable portions 101 which are detachably connected with each other. The first rotary body 1 is split into petals in a circumferential direction by disassembling the first separable portions 101 by the first disassembly device 10, or respective petal segments of the first rotary body 1 are assembled in the circumferential direction by combining the first separable portions 101 by the first disassembly device 10.

In some embodiments, the first separable portion 101 is a planar frame or plate structure including a bottom, and its planar shape is adapted to a shape of an arc-shaped petal structure of the first rotary body 1, that is, it can be adapted to the shape of the petal segment of the first rotary body 1. Further, the first separable portion 101 is a rectangular frame or plate structure which is adapted to a diameter dimension of the first rotary body 1 in a length direction and a radial dimension of the first rotary body 1 in a width direction. In addition, the number of the first separable portions 101 corresponds to the number of the petals of the first rotary body 1, so that respective petal segments of the first rotary body 1 are fixed by the first separable portions 101. In some embodiments, at least two first separable portions 101 are detachably connected by a fastener such as a bolt.

After the first rotary body 1 is fixed to the first disassembly device 10, the first rotary body 1 is split into at least two petal segments in the circumferential direction by removing a fastener such as a bolt, and each petal segment is supported and fixed by the first separable portion 101. In some embodiments, the number of the petal segments of the first rotary body 1 is the same as the number of the first separable portions 101. In some embodiments, petal surfaces of respective petal segments are parallel to splicing planes of respective first separable portions 101, so that the respective petal segments carried by the first separable portions 101 are transported to a destination where they are to be fitted and then are reassembled.

FIG. 3 shows a schematic diagram of the second disassembly device 20, and the second disassembly device 20 is configured for fixing the second rotary body 2. The second disassembly device 20 includes at least two second separable portions 201 which are detachably connected with each other, and the second rotary body 2 is split into petals in the circumferential direction by disassembling the second separable portions 201 by the second disassembly device 20, or respective petal segments of the second rotary body 2 are assembled in the circumferential direction by combining the second separable portions 201 by the second disassembly device.

In some embodiments, the second separable portion 201 is a planar frame or plate structure including a bottom, and its planar shape is adapted to a shape of an arc-shaped petal structure of the second rotary body 2, that is, it can be adapted to the shape of the petal segment of the second rotary body 2. In some embodiments, the second separable portion 201 is a rectangular frame or plate structure which is adapted to a diameter dimension of the second rotary body 2 in a length direction and a radial dimension of the second rotary body 2 in a width direction. In addition, the number of the second separable portions 201 corresponds to the number of the petals of the second rotary body 2, so that respective petal segments of the second rotary body 2 are fixed by the second separable portions 201. In some embodiments, at least two second separable portions 201 are detachably connected by a fastener such as a bolt.

After the second rotary body 2 is fixed to the second disassembly device 20, the second rotary body 2 is split into at least two petal segments in the circumferential direction by removing a fastener such as a bolt, and each petal segment is supported and fixed by the second separable portion 201. In some embodiments, the number of the petal segments of the second rotary body 2 is the same as the number of the second separable portions 201. In some embodiments, petal surfaces of respective petal segments are parallel to splicing planes of respective second separable portions 201, so that the respective petal segments carried by the second separable portions 201 are transported to a destination where they are to be fitted and then are reassembled.

An embodiment of the present application provides an electric machine splitting or assembling device, the first rotary body 1 and the second rotary body 2 of the electric machine are separated or assembled by the sleeving device 30, the first rotary body 1 is split into petals in the circumferential direction or the respective petal segments after being split is assembled to the first rotary body 1 by the first disassembly device 10, the second rotary body 2 is split into petals in the circumferential direction or the respective petal segments after being split is assembled to the second rotary body 2 by the second disassembly device 20, and the respective petal segments after being split is fixedly connected with and transported together with the disassembly device. Either of the first rotary body 1 and the second rotary body 2 is a stator, and the other of the first rotary body 1 and the second rotary body 2 is a rotor, which effectively solves the problem that the electric machine exceeds the road transportation limit and the transportation cost is high.

Below, the structure of each component of the electric machine splitting or assembling device provided by an embodiment of the present application is further described in detail with reference to the accompanying drawings.

Please with reference to FIGS. 1 and 4 together, the sleeving device 30 includes a first sleeving member 31 and a second sleeving member 32 which are disposed coaxially to each other, and as shown in FIG. 4, the first sleeving member 31 includes a first flange portion 311 by which the first sleeving member 31 is connected with the first rotary body 1; and the second sleeving member 32 includes a second flange portion 321 by which the second sleeving member 32 is connected with the second rotary body 2. The structure of the sleeving device 30 is related to the structure of the electric machine. For ease of description, the embodiments of the present application are described by taking a large-diameter electric machine having a structure of an inner stator and an outer rotor as an example.

As shown in FIG. 1, the second rotary body 2 is sleeved on an outer peripheral side of the first rotary body 1, the first rotary body 1 is a stator, and the second rotary body 2 is a rotor. The first sleeving member 31 further includes a first body portion 312 connected with the first flange portion 311, the second sleeving member 32 further includes a second body portion 322 connected with the second flange portion 321, and the first body portion 312 is disposed to overlap with the second body portion 322 in an axial direction.

As shown in FIG. 4, the first body portion 312 of the first sleeving member 31 of the sleeving device 30 is a barrel type cylindrical structure, the second body portion 322 of the second sleeving member 32 is similarly a barrel type cylindrical structure, and the first body portion 312 is coaxially disposed on an outer peripheral side of the second body portion 322. The first body portion 312 and the second body portion 322 have lengths in the axial direction which overlap with one another at a certain degree.

In some embodiments, the length of portions of the first body portion 312 and the second body portion 322 which overlap with one another axially is larger than half of an axial length of the first sleeving member 31 or the second sleeving member 32. When the second sleeving member 32 is hoisted to drive the rotor to move in the axial direction, the second body portion 322 can move along an inner wall of the first body portion 312, so as to guide the second sleeving member 32 to drive the rotor to move in the axial direction, thereby removing the rotor from the electric machine. Therefore, the first sleeving member 31 and the second sleeving member 32 have sufficient rigidity and strength to resist the magnetic attraction force between the stator and the rotor without being deformed, thereby preventing the rotor 2 from being stuck due to offset in the removing process which causes the stator to be damaged, or preventing the rotor that cannot be removed from the electric machine.

Please with reference to FIGS. 1 to 3 together, in the case that the first rotary body 1 is a stator and the second rotary body 2 is a rotor, the first disassembly device 10 is configured for fixing the stator 1 and splitting the stator 1 into petals. As shown in FIG. 2, the first disassembly device 10 includes a first fixing portion 11 which is configured for fixing a stator flange of the stator, and each first separable portion 101 includes at least one first fixing portion 11.

In some embodiments, the first fixed portion 11 is an arc-shaped structure in a column structure form and corresponding to the first separable portion 101 and has a height adapted to a height of the stator flange.

In addition, the first disassembly device 10 further includes a plurality of second fixing portions 12 disposed radially outward of the first fixing portion 11, and the first separable portion 101 is provided with at least one second fixing portion 12 thereon which is configured for fixing an end cover 4 of the electric machine. In some embodiments, the second fixing portion 12 may also be configured for fixing other non-electromagnetic components of the electric machine.

In some embodiments, the second fixing portion 12 may be disposed as a detachable fixing structure in the form of a bolt and the like, so as to facilitate the removal of the end cover 4. That is, the other non-electromagnetic components of the electric machine may be fixed on the first separable portions 101 of the first disassembly device 10 together with the petal segments of the first rotary body for transportation.

Further, the second disassembly device 20 includes a third fixing portion 23 and a fourth fixing portion 24 disposed radially outward of the third fixing portion 23, the third fixing portion 23 is configured for fixing a rotor flange at an axial end of a rotor bracket of the rotor 2, and the fourth fixing portion 24 is configured for fixing the other axial end of the rotor bracket; and each second separable portion 201 includes at least one third fixing portion 22 and at least one fourth fixing portion 23.

For a permanent magnet electric machine, the rotor 2 includes a rotor bracket and a magnetic pole module disposed on a mounting surface of the rotor bracket. The rotor bracket of the rotor 2 is divided into at least two rotor bracket segments in the circumferential direction, and each rotor segment includes a rotor bracket segment and several magnetic pole modules. Since the rotor bracket is a thin plate structure, both axial ends of the rotor bracket are fixed by the third fixing portion 23 and the fourth fixing portion 24 of the second disassembly device 20, which can avoid deformation of the rotor bracket during transportation as much as possible.

In addition, the first separable portion 101 further includes a first connecting portion 19, and the first separable portion 101 is detachably connected with the adjacent first separable portion 101 by the first connecting portion 19; and the second separable portion 201 further includes a second connecting portion 28, the second separable portion 28 is detachably connected with the adjacent second separable portion 201 by the second connecting portion 28.

Since the magnetic pole modules are arranged in the circumferential direction on a mounting surface of the rotor bracket, there is a large magnetic attraction force among the respective rotor segments, and in order to facilitate the split and disassembly of the rotor 2, the second disassembly device 20 needs to have sufficient structural strength to overcome the magnetic attraction force during split. Therefore, an axial height of the second connecting portion 28 is h, an axial height of the rotor 2 is H, and 0.5H<h<H. The axial height of the second connecting portion 28 is disposed in such a way, thereby facilitating the stable support for the split rotor segments and preventing the deformation of the rotor bracket during split.

In some embodiments, the second connecting portion 28 is protruded from a bottom of the second disassembly device 20 in a vertical direction and is disposed corresponding to a petal face of the rotor segment, the second connecting portion 28 is provided with a bolt hole and the like, and a fastener such as a bolt can pass through the bolt holes of respective second connecting portions 28 to split the second separable portions 201 into pedals or combine the second separable portions 201.

In addition, the electric machine splitting or assembling device according to an embodiment of the present application further includes a first driving device (not shown in the drawings) and a second driving device (not shown in the drawings), the first driving device is configured for assisting the separation part 101 in splitting the first rotary body 1 into petals, and the second driving device is configured for assisting the second separable portion 201 in splitting the second rotary body 2 into petals.

In some embodiments, the first rotary body 1 is a stator, and the first driving device may be a traction device such as a manual hoist to overcome the frictional force of the ground so as to disassemble respective petals of the stator. The second rotary body 2 is a rotor, the magnetic pole modules of the rotor have magnetic, and the magnetic attraction force among respective petals of the rotor is relatively large, and it is necessary to overcome the ground friction force and the magnetic attraction force by means of the second driving device to disassemble the respective petals. In some embodiments, the second driving device is a hydraulic cylinder or an air cylinder.

Figure 5:
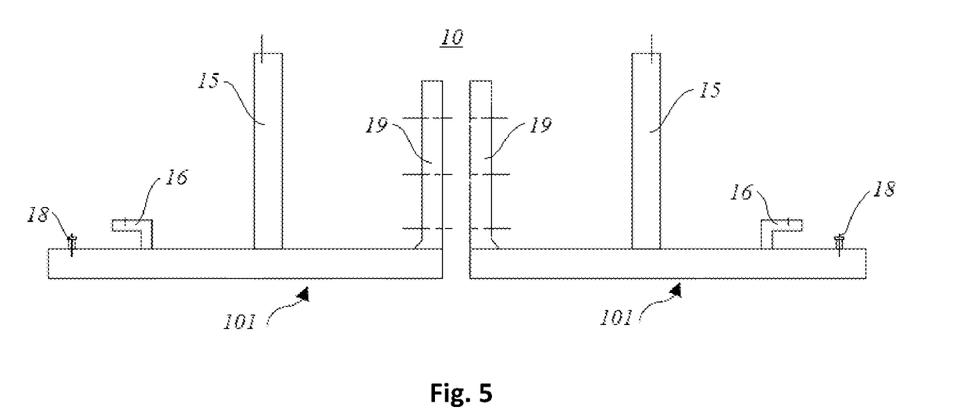
FIG. 5 is a schematic structural diagram of another first disassembly device in an electric machine splitting or assembling device provided by an embodiment of the present application.
Figure 6:
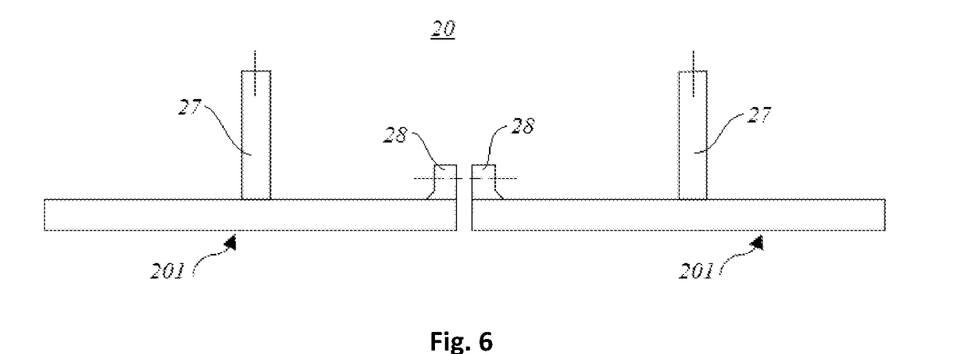
FIG. 6 is a schematic structural diagram of another second disassembly device in an electric machine splitting or assembling device provided by an embodiment of the present application.

Please with reference to FIGS. 5 and 6 together, an embodiment of the present application also provides another electric machine splitting or assembling device, which is similar to the structure shown in FIGS. 2 to 4, the difference is that the electric machine splitting or assembling device is configured for assisting in disassembling an electric machine having a structure of an inner rotor and an outer stator, and therefore, the first disassembly device 10, the second disassembly device 20, and the sleeving device 30 have different structures according to the difference of the positions of the stator 1 and the rotor 2.

In some embodiments, the first rotary body 1 is a rotor, the second rotary body 2 is a stator, and the first disassembly device 10 is configured for fixing the split rotor segments. The first disassembly device 10 includes a fifth fixing portion 15 and a sixth fixing portion 16 disposed radially outward of the fifth fixing portion 15, the fifth fixing portion 15 is configured for fixing a rotor flange of a rotor at an axial end of the rotor bracket, and the six fixing portion 16 is configured for fixing the other axial end of the rotor bracket; and each first separable portion 101 includes at least one fifth fixing portion 15 and at least one sixth fixing portion 16. The fifth fixing portion 15 and the sixth fixing portion 16 are segmented into arc structures in a circumferential direction corresponding to the first separable portions 101.

As mentioned above, since the rotor bracket is a thin plate structure, both axial ends of the rotor bracket are fixed by the fifth fixing portion 15 and the sixth fixing portion 16 of the first disassembly device 10, so as to avoid the deformation of the rotor bracket during transportation as much as possible.

In addition, the first disassembly device 10 further includes a plurality of eighth fixing portions 18 disposed radially outward of the first fixing portion 11, and the first separable portion 101 is provided with at least one eighth fixing portion 18 thereon which is configured for fixing an end cover 4 of the electric machine. The eighth fixing portion 18 may also be configured for fixing other non-electromagnetic components of the electric machine.

In some embodiments, the eighth fixing portion 18 may be disposed as a detachable fixing structure in the form of a bolt and the like, so as to facilitate the removal of the end cover 4. That is, the other non-electromagnetic components of the electric machine may be fixed on the second separable portion 201 of the second disassembly device 20 together with the rotor segments for transportation.

The second disassembly device 20 is configured for fixing the split stator segments and includes a seventh fixing portion 27 for fixing a stator flange of the stator. Each second separable portions 201 includes at least one seventh fixing portion 27, the second separable portion 201 further includes a second connecting portion 28, and the second separable portion 28 is detachably connected with the adjacent second separable portion 201 by the second connecting portion 28.

In addition, the first separable portion 101 further includes a first connecting portion 19, and the first separable portion 101 is detachably connected with the adjacent first separable portion 101 by the first connecting portion 19; and the second separable portion 201 further includes a second connecting portion 28, the second separable portion 28 is detachably connected with the adjacent second separable portion 201 by the second connecting portion 28.

As mentioned above, since magnetic pole modules are arranged in the circumferential direction on an mounting surface of the rotor bracket, there is a large magnetic attraction force among the respective rotor segments, and in order to facilitate the split and disassembly of the rotor 2, in the present embodiment, the first disassembly device 10 needs to have sufficient structural strength to overcome the magnetic attraction force during split. Therefore, an axial height of the first connecting portion 19 is h, an axial height of the rotor 2 is H, and 0.5H<h<H. The axial height of the first connecting portion 19 is disposed in such a way, thereby facilitating the stable support for the split rotor segments and preventing the deformation of the rotor bracket during split.

Please with reference to FIGS. 7 to 14 together, an embodiment of the present application further provides an electric machine splitting method, splitting the electric machine into petals by using any one of the above-mentioned electric machine splitting or assembling device. The electric machine includes a first rotary body 1 and a second rotary body 2 disposed coaxially to each other, either of the first rotary body 1 and the second rotary body 2 is a stator, and the other of the first rotary body 1 and the second rotary body 2 is a rotor. For ease of description, the embodiments of the present application are described by taking an electric machine having a structure of an inner stator and an outer rotor as an example.

Figure 7:
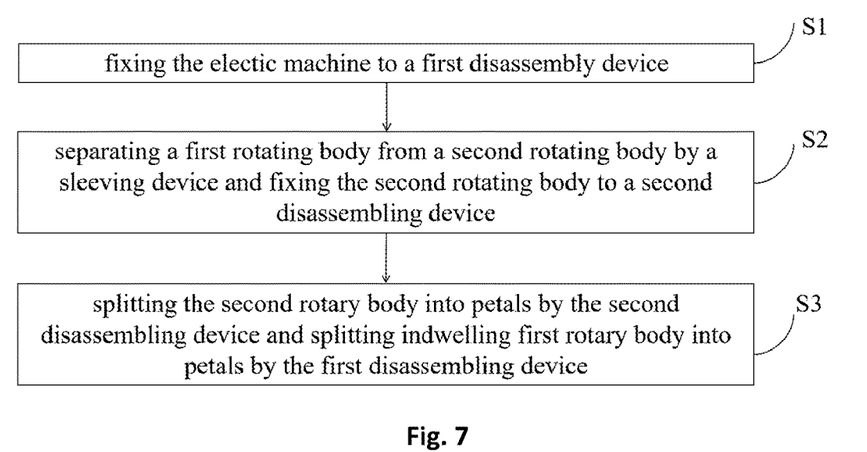
FIG. 7 is a flowchart of an electric machine splitting method according to an embodiment of the present application.

The electric machine is generally a pre-mounted and qualified split electric machine, especially a large-diameter electric machine including a pre-manufactured split stator, a pre-manufactured split rotor, and a pre-manufactured split end cover. The electric machine splitting method includes step S1: fixing the electric machine to a first disassembly device 10;

step S2: separating a first rotary body 1 from a second rotary body 2 by a sleeving device 30, and fixing the second rotary body 2 to a second disassembly device 20; and step S3: splitting the second rotary body 2 into petals by the second disassembly device 20 and splitting indwelling first rotary body 1 into petals by the first disassembly device 10.

The present application provides an electric machine splitting method, the first rotary body 1 is separated from the second rotary body 2 of the electric machine by the sleeving device 30 of the electric machine splitting or assembling device, the first rotary body 2 is split into petals in the circumferential direction by the first disassembly device 10, the second rotary body 2 is split into petals in the circumferential direction by the second disassembly device 20, and respective petal segments are transported together with the splitting device, which effectively solves the problem that the electric machine exceeds the road transportation limit and the transportation cost is high. Either of the first rotary body 1 and the second rotary body 2 is a stator, and the other of the first rotary body 1 and the second rotary body 2 is a rotor.

Figure 11:
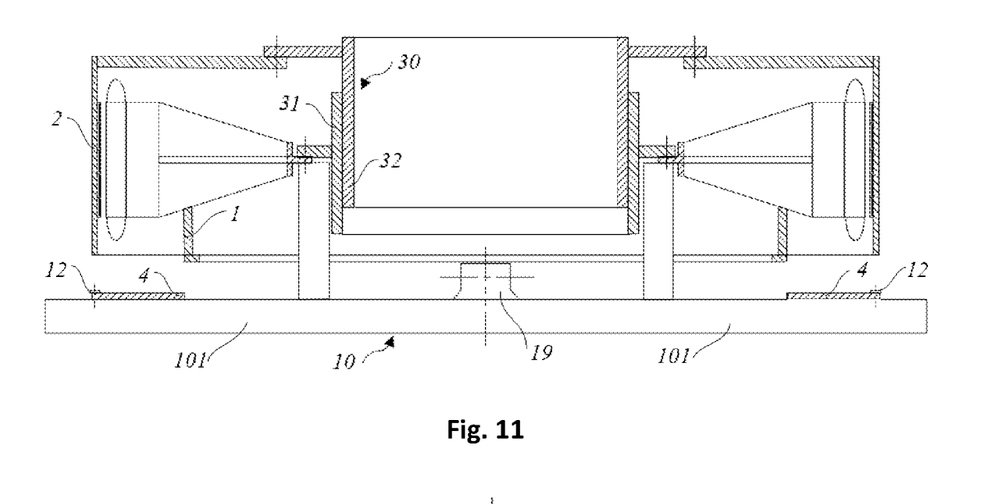
FIG. 11 is a schematic diagram of a scene where the sleeving device is placed in the electric machine shown in FIG. 1.
Figure 12:
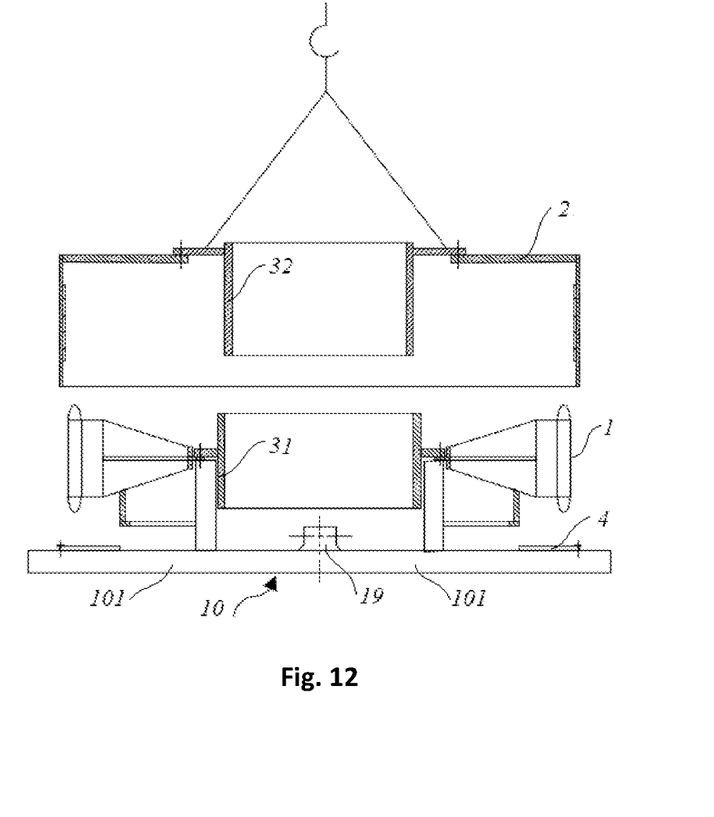
FIG. 12 is a schematic diagram of a scene where a second sleeving device of the sleeving device shown in FIG. 4 is removed from the second rotary body.

As shown in FIGS. 11 and 12, in the step S2, the first rotary body 1 is separated from the second rotary body 2 by the sleeving device 30, and the second rotary body 2 is fixed to the second disassembly device 20, which includes step S21: connecting the first sleeving member 31 with the first rotary body 1 and connecting the second sleeving member 32 with the second rotary body 2;

step S22: hoisting the second sleeving member 32 to move along an inner wall or an outer wall of the first sleeving member 31 to separate the second rotary body 2 from the first rotary body 1; and step S23: fixing the second rotary body 2 to the second disassembly device 20.

Figure 13:
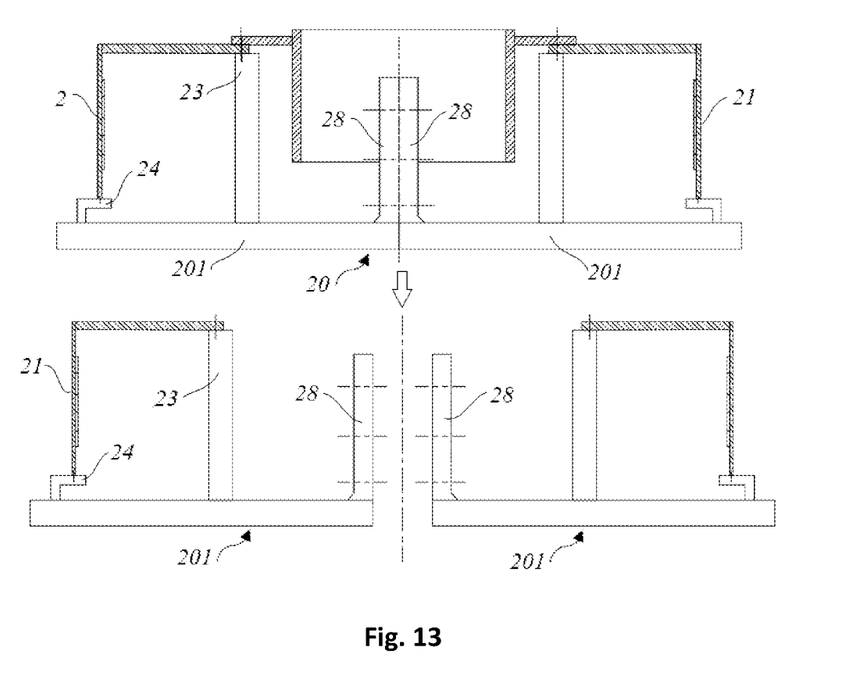
FIG. 13 is a schematic diagram of a scene where the second rotary body shown in FIG. 1 is disassembled by the second disassembly device.

As shown in FIG. 13, in the step S3, the second rotary body 2 is split into petals by the second disassembly device 20, which includes step S31: removing the second sleeving member 32 from the second rotary body 2;

step S32: removing a fastener between the second connecting portions 28 of each adjacent two second separable portions 201; and step S33: separating respective second separable portions 201 from each other by the second driving device 50 to fix respective petal segments of the second rotary body 2 to the respective second separable portions 201 for a splitting operation.

Figure 14:
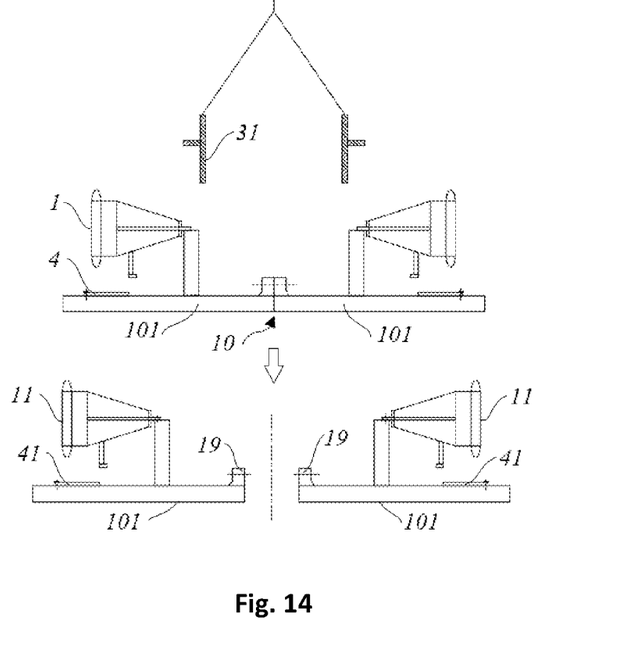
FIG. 14 is a schematic diagram of a scene where the first rotary body shown in FIG. 1 is disassembled by the first disassembly device.

As shown in FIG. 14, in the step S3, the first rotary body 1 indwelling in the first disassembly device 10 is split into petals by the first disassembly device 10, which includes step S31': removing the first sleeving member 31 from the first rotary body 1; and step S32': removing a fastener between the first separation portion of each adjacent two first separable portions 101; and step S33': separating respective first separable portions 101 from each other by the first driving device 40 to fix respective petal segments of the first rotary body 1 to the respective first separable portions 101 for a splitting operation.

Figure 8:
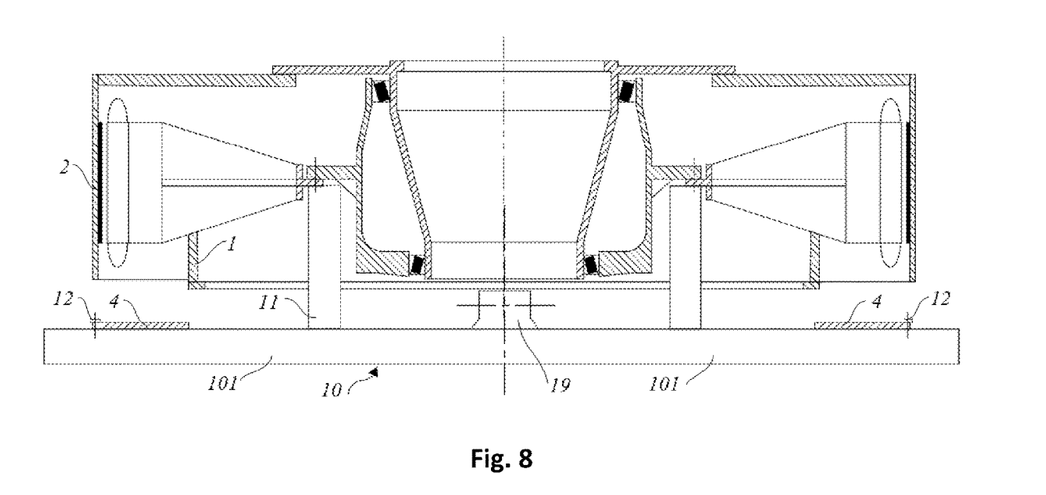
FIG. 8 is a schematic diagram of a scene where the electric machine shown in FIG. 1 is placed in the first disassembly device.
Figure 9:
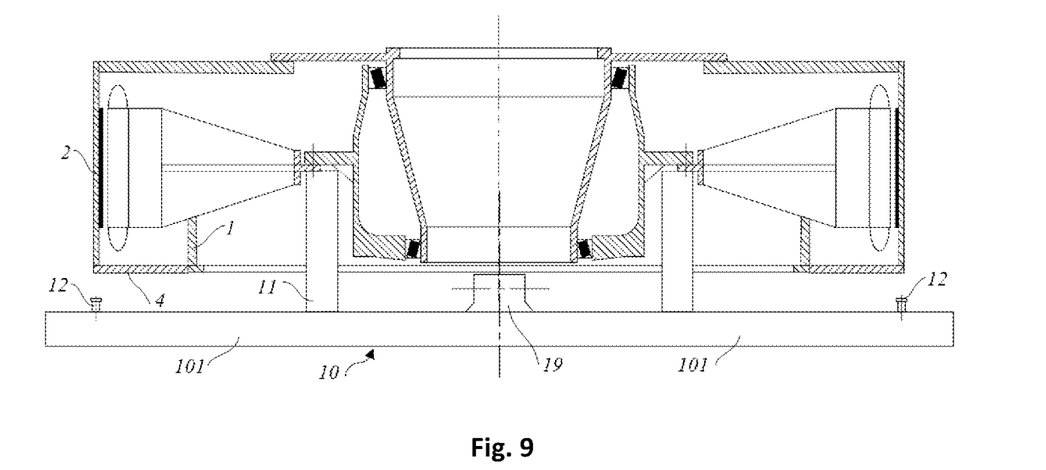
FIG. 9 is a schematic diagram of a scene where an end cover of the electric machine shown in FIG. 8 is fixed to the first disassembly device.
Figure 10:
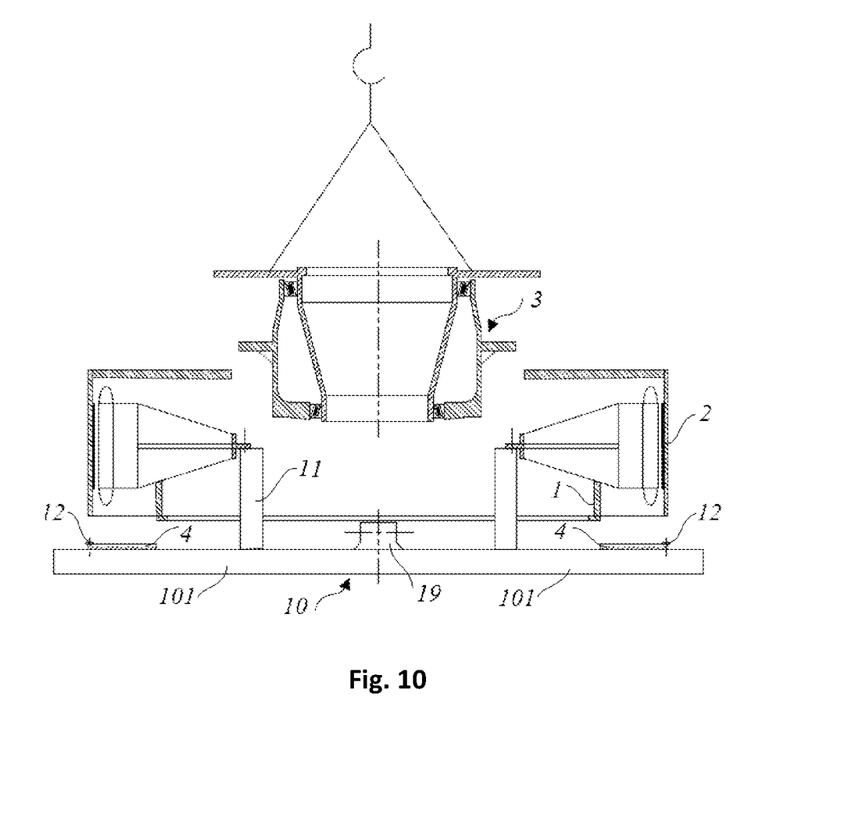
FIG. 10 is a schematic diagram of a scene where an electric machine spindle shown in FIG. 1 is removed.

In addition, as shown in FIGS. 8 to 10, before the step S2, that is, before separating the first rotary body 1 from the second rotary body 2 by the assembling device 30 and fixing the second rotary body 2 to the second disassembly device 20, the method further includes removing non-electromagnetic components of the electric machine from the electric machine.

The non-electromagnetic components include an end cover 4, the spindle 3 and other large components of the electric machine, the end cover 4 is fixed to first disassembly device 10 after being removed from the electric machine, as shown in FIG. 9.

Further, since the end cover 4 is also a circular plate structure with a relatively large diameter dimension, the step S3 further includes when indwelling first rotary body 1 is split into petals by the first disassembly device 10, splitting the end cover 4 into petals by the first disassembly device 10. The splitting method of the end cover 4 is described above and will not be repeated.

As shown in FIG. 10, removing the spindle 3 is hoisting the spindle 3 as a whole from the first disassembly device 10. Since the spindle 3 is located at an innermost side of the electric machine, its maximum diameter can generally be controlled within the transportation limit size, and therefore, the spindle 3 can be directly transported as a whole after being hoisted away.

In addition, the electric machine splitting method provided by an embodiment of the present application further includes step S4: transporting respective petal segments after being split to a destination, where they are to be fitted, together with corresponding first disassembly device 10 or the second disassembly device 20 respectively.

For example, the respective petal segments of the first rotary body 1 and the petal segments of the end cover 4 are fixed together with the first separable portions 101 of the first disassembly device 10 and transported to the next destination where they are to be fitted, the respective petal segments of the rotary body 2 is fixed together with the second separable portions 201 of the second disassembly device 20 and transported to the next destination where they are to be fitted, and the spindle 3 is transported to the destination where they are to be fitted by other fixing device.

After reaching the destination where they are to be fitted, the petal segments of the first rotary body 1, the petal segments of the second rotary body 2, the spindle 3, and the petal segments of the end cover 4 are assembled to a complete electric machine.

Figure 15:
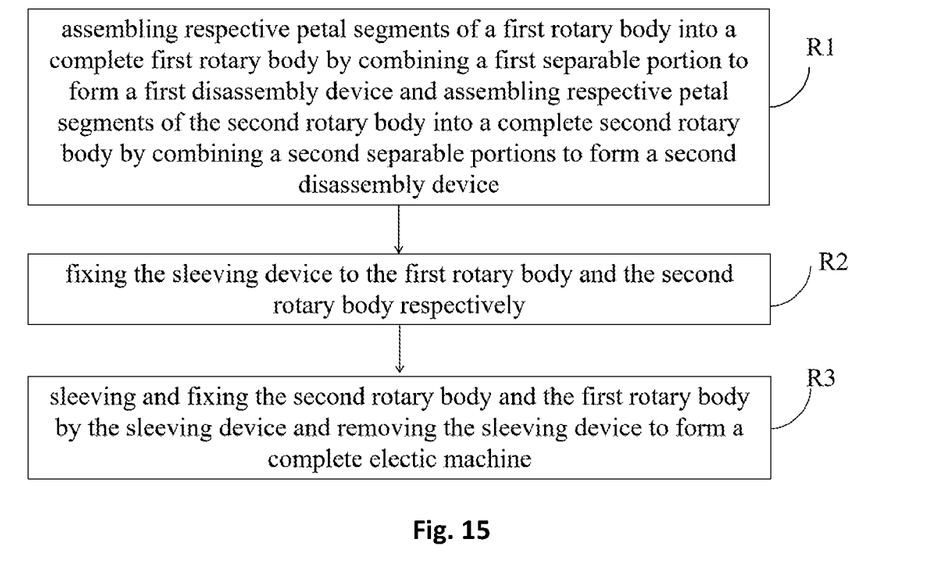
FIG. 15 is a flowchart of an electric machine assembling method according to an embodiment of the present application.

Referring to FIG. 15, an embodiment of the present application also provides an electric machine assembling method, which is roughly opposite to the main steps of the electric machine splitting method and includes step R1: assembling respective petal segments of a first rotary body 1 into a complete first rotary body 1 by combining a first separable portion 101 to form a first disassembly device 10; and assembling respective petal segments of the second rotary body 2 into a complete second rotary body 2 by combining a second separable portions 201 to form a second disassembly device 20; and since the first separable portion 101 and the second separable portion 201 are different devices, they can be operated synchronously depending on the situations.

Step R2: fixing the sleeving device 30 to the first rotary body 1 and the second rotary body 2 respectively and hoisting the second rotary body 2 away from the second disassembly device 20; and when the complete electric machine is assembled with the first disassembly device 10 as a main fixing structure, hoisting the second rotary body 2 from the second disassembly device 20 and mounting the second rotary body 2 to the first rotary body 1; and when the complete electric machine is assembled with the second disassembly device 20 as a main fixing structure, hoisting the first rotary body 1 from the first disassembly device 10 and mounted the first rotary body 1 to the second rotary body 2.

Step R3: sleeving and fixing the second rotary body 2 and the first rotary body 1 by the sleeving device 30 and removing the sleeving device 30 to form a complete electric machine including the first rotary body 1 and the second rotary body 2. Finally, the complete electric machine is hoisted from the first disassembly device 10.

It should be noted that the present application only describes the splitting, assembling, and transporting methods by taking an electric machine including a split stator 1, a split rotor 2, and a split end cover 4 as examples, without doubt, split components of the electric machine may not be limited to the above-mentioned stator 1, rotor 2, and end cover 4, and when there are other split components, corresponding methods can be obtained by reasonable expansion according to the concept of split, assembly, and transportation of the present application.

It can be understood that the above-mentioned electric machine splitting method and electric machine assembling method are also applicable to the split of a large-diameter electric machine having a structure of an inner rotor and an outer stator and will not be repeated.

Those skilled in the art should understand that the embodiments described above are all illustrative and unrestrictive. Different technical features appearing in different embodiments can be combined to achieve beneficial effects. Those skilled in the art should be able to understand and realize other modified embodiments of the disclosed embodiments on the basis of studying the drawings, the description, and the claims. In the claims, the term "include" does not exclude other device or step; when an article is not modified by a quantitative word, it is intended to include one/one kind of or more/more kinds of articles, and can be used interchangeably with "one/one kind of or more/more kinds of articles"; and the terms "first" and "second" are used to indicate names rather than to indicate any specific order. Any reference number in the claims should not be understood as limiting the scope of protection. The functions of multiple parts appearing in the claims can be realized by a single hardware or software module. The appearance of certain technical features in different dependent claims does not mean that these technical features cannot be combined to achieve beneficial effects.

The invention claimed is:

1. A device for splitting or assembling an electric machine of a wind turbine, the device comprising at least one of a first disassembly device or a second disassembly device, and a sleeving device, wherein:
   the sleeving device is configured for separating or coaxially sleeving a first rotary body and a second rotary body of the electric machine;
   the first disassembly device is configured for fixing the first rotary body and comprises at least two first separable portions which are detachably connected with each other, and the first rotary body is split into petals in a circumferential direction by disassembling the first separable portions by the first disassembly device, or respective petal segments of the first rotary body are assembled in the circumferential direction by combining the first separable portions by the first disassembly device; and
   the second disassembly device is configured to be fixed to the second rotary body and comprises at least two second separable portions which are detachably connected with each other, and the second rotary body is split into petals in the circumferential direction by disassembling the second separable portions by the second disassembly device, or respective petal segments of the second rotary body are assembled in the circumferential direction by combining the second separable portions by the second disassembly device.

2. The device according to claim 1, wherein the sleeving device comprises a first sleeving member and a second sleeving member disposed coaxially with each other, the first sleeving member comprises a first flange portion, the second sleeving member comprises a second flange portion, the first sleeving member is connected with the first rotary body by the first flange portion, and the second sleeving member is connected with the second rotary body by the second flange portion.

3. The device according to claim 2, wherein the first sleeving member further comprises a first body portion connected with the first flange portion, the second sleeving member further comprises a second body portion connected with the second flange portion, and the first body portion is disposed to overlap with the second body portion in an axial direction.

4. The device according to claim 3, wherein a length of portions of the first body portion and the second body portion overlapping with one another in the axial direction is larger than half of an axial length of the first sleeving member or the second sleeving member.

5. The device according to claim 1, wherein:
   the first rotary body is a stator and the second rotary body is a rotor; and
   the first disassembly device comprises a first fixing portion configured for fixing a stator flange of the stator; and each of the first separable portions comprises at least one first fixing portion.

6. The device according to claim 5, wherein the first disassembly device further comprises a plurality of second fixing portions which are disposed radially outward of the first fixing portion, and the first separable portion is provided with at least one second fixing portion thereon which is configured for fixing an end cover of the electric machine.

7. The device according to claim 5, wherein the second disassembly device comprises a third fixing portion and a fourth fixing portion which is disposed radially outward of the third fixing portion, the third fixing portion is configured for fixing a rotor flange at an axial end of a rotor bracket of the rotor, and the fourth fixing portion is configured for fixing the other axial end of the rotor bracket; and each of the second separable portions comprises at least one third fixing portion and at least one fourth fixing portion.

8. The device according to claim 5, wherein:
   the first separable portion further comprises a first connecting portion and is detachably connected with the adjacent first separable portion by the first connecting portion;
   the second separable portion further comprises a second connecting portion and is detachably connected with the adjacent second separable portion by the second connecting portion; and
   an axial height of the second connecting portion is h, an axial height of the rotor is H, and $0.5H<h<H$.

9. The device according to claim 1, wherein:
   the first rotary body is a rotor and the second rotary body is a stator; and
   the first disassembly device comprises a fifth fixing portion and a sixth fixing portion which is disposed radially outward of the fifth fixing portion, the fifth fixing portion is configured for fixing a rotor flange at an axial end of a rotor bracket, and the sixth fixing portion is configured for fixing the other axial end of the rotor bracket; and each of the first separable portions comprises at least one fifth fixing portion and at least one sixth fixing portion.

10. The device according to claim 9, wherein the first disassembly device further comprises a plurality of eighth fixing portions which are disposed radially outward of the first fixing portion, and the first separable portion is disposed with at least one eighth fixing portion thereon which is configured for fixing an end cover of the electric machine.

11. The device according to claim 9, wherein the second disassembly device comprises a seventh fixing portion which is configured for fixing a stator flange of the stator; and each of the second separable portions comprises at least one seventh fixing portion.

12. The device according to claim 9, wherein:
the first separable portion further comprises a first connecting portion, and the first separable portion is detachably connected with the adjacent first separable portion by the first connecting portion;
the second separable portion further comprises a second connecting portion, and the second separable portion is detachably connected with the adjacent second separable portion by the second connecting portion; and
an axial height of the first connecting portion is h, an axial height of the rotor is H, and 0.5H<h<H.

13. The device according to claim 1, further comprising a first driving device and/or a second driving device, the first driving device is configured for assisting the first separable portions in splitting the first rotary body into petals or assembling the first rotary body, and the second driving device is configured for assisting the second separable portions in splitting the second rotary body into petals or assembling the second rotary body.

14. An electric machine splitting method, splitting an electric machine of a wind turbine into petals by using the electric machine splitting or assembling device according to claim 1, the electric machine comprising a first rotary body and a second rotary body disposed coaxially to each other, wherein the electric machine splitting method comprises:
fixing the electric machine to the first disassembly device;
separating the first rotary body from the second rotary body by a sleeving device and fixing the second rotary body to the second disassembly device; and
splitting the second rotary body into petals by the second disassembly device and splitting indwelling first rotary body into petals by the first disassembly device.

15. The electric machine splitting method according to claim 14, wherein separating the first rotary body from the second rotary body by a sleeving device and fixing the second rotary body to the second disassembly device comprise:
connecting a first sleeving member with the first rotary body and connecting a second sleeving member with the second rotary body;
hoisting the second sleeving member to move along an inner wall or an outer wall of the first sleeving member to separate the second rotary body from the first rotary body; and
fixing the second rotary body to the second disassembly device.

16. The electric machine splitting method according to claim 14, wherein splitting the second rotary body into petals by the second disassembly device comprises:
removing the second sleeving member from the second rotary body;
removing a fastener between the second connecting portions of each adjacent two second separable portions; and
separating respective second separable portions from each other by the second driving device to fix respective petal segments of the second rotary body to respective second separable portions for a splitting operation.

17. The electric machine splitting method according to claim 14, wherein splitting indwelling first rotary body into petals by the first disassembly device comprises:
removing the first sleeving member from the first rotary body;
removing a fastener between the first connecting portions of each adjacent two first separable portions; and
separating respective first separable portions from each other by the first driving device to fix respective petal segments of the first rotary body to respective first separable portions for a splitting operation.

18. The electric machine splitting method according to claim 14, further comprising:
before separating the first rotary body from the second rotary body by a sleeving device and fixing the second rotary body to the second disassembly device, removing non-electromagnetic members of the electric machine from the electric machine, the non-electromagnetic member comprising an end cover and a spindle of the electric machine, wherein the end cover is fixed to the first disassembly device after being removed from the electric machine.

19. The electric machine splitting method according to claim 14, further comprising:
when splitting indwelling first rotary body into petals by the first disassembly device, splitting the end cover into petals by the first disassembly device.

20. An electric machine assembling method, assembling respective petal segments of an electric machine of a wind turbine by using the electric machine splitting or assembling device according to claim 1, the electric machine comprising a first rotary body and a second rotary body disposed coaxially to each other, wherein the electric machine assembling method comprises:
assembling respective petal segments of the first rotary body into a complete first rotary body by combining the first separable portions to form a first assembling device and assembling respective petal segments of the second rotary body into a complete second rotary body by combining the second separable portions to form a second disassembly device;
fixing the sleeving device to the first rotary body and the second rotary body respectively; and
sleeving and fixing the first rotary body and the second rotary body by the sleeving device and disassembling the sleeving device to form a complete electric machine.

* * * * *